March 30, 1937. J. C. HUTCHINSON 2,075,038
METHOD AND APPARATUS FOR MANUFACTURING AERATING
BLOCKS FOR SEWAGE DISPOSAL FILTER BEDS
Filed Feb. 18, 1935 2 Sheets-Sheet 1
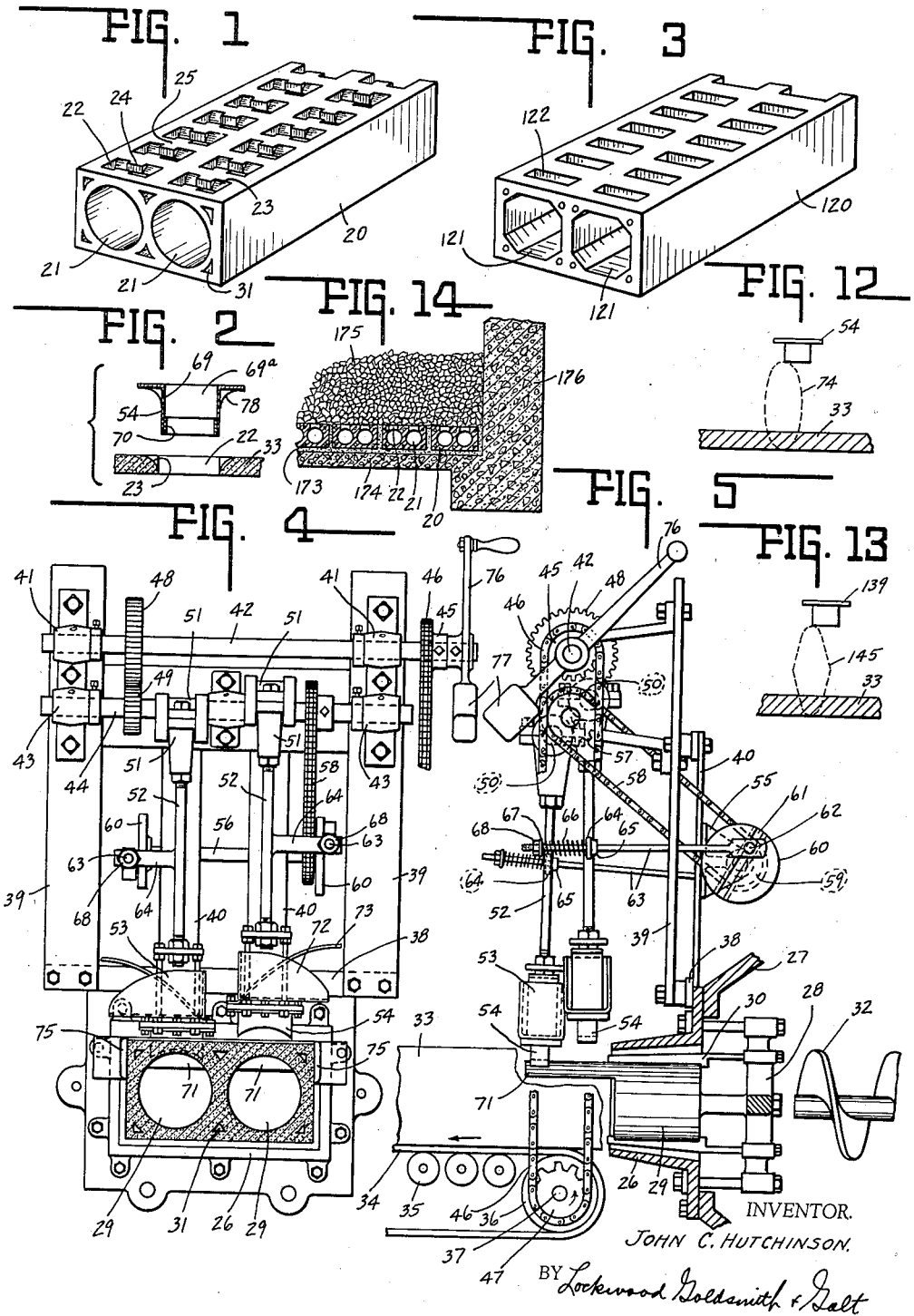
INVENTOR.
JOHN C. HUTCHINSON.
BY Lockwood Goldsmith & Galt
ATTORNEYS.

March 30, 1937. J. C. HUTCHINSON 2,075,038
METHOD AND APPARATUS FOR MANUFACTURING AERATING
BLOCKS FOR SEWAGE DISPOSAL FILTER BEDS
Filed Feb. 18, 1935 2 Sheets-Sheet 2
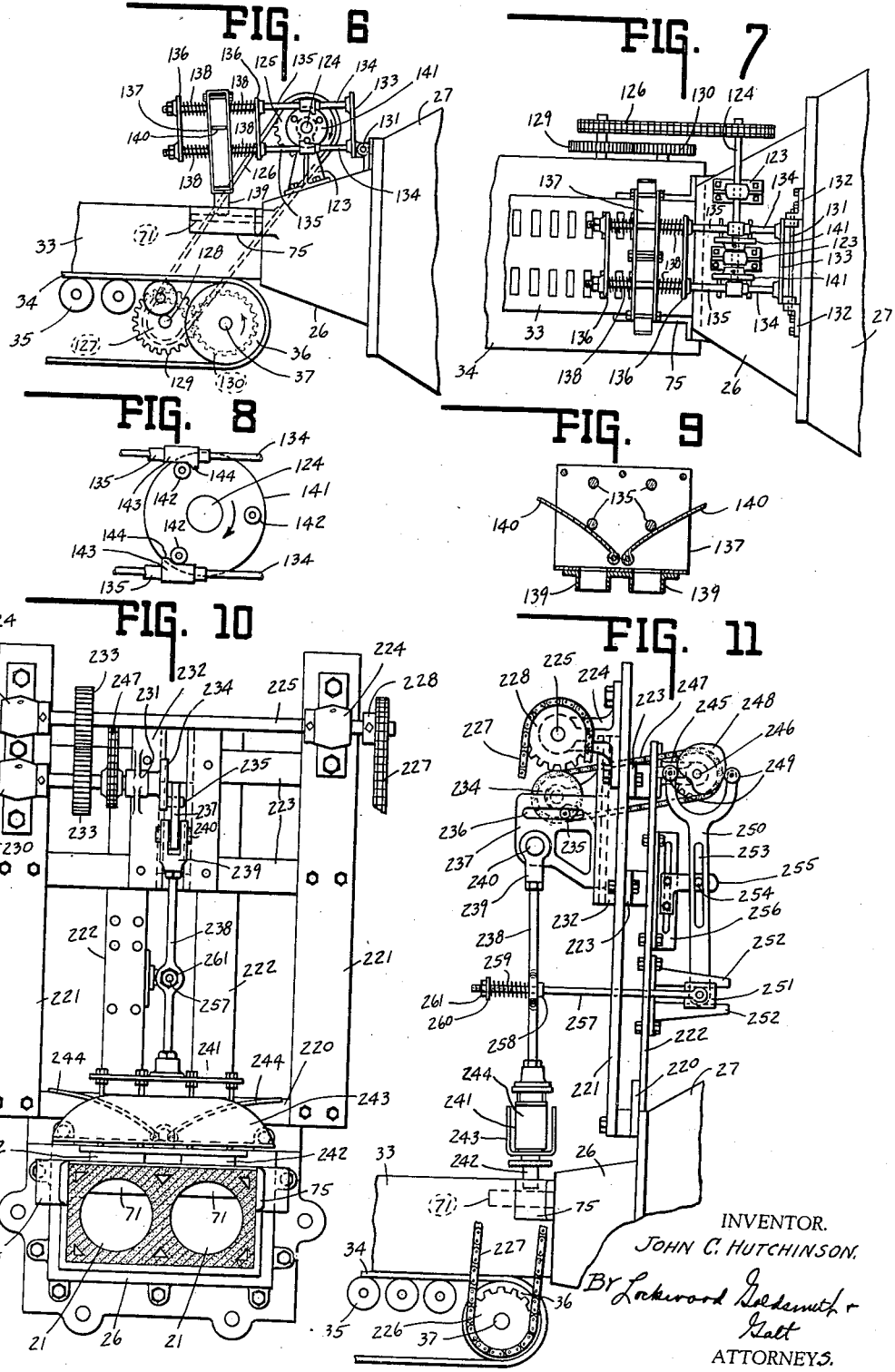
INVENTOR.
JOHN C. HUTCHINSON.
By Lockwood Goldsmith &
Galt
ATTORNEYS.

Patented Mar. 30, 1937

2,075,038

UNITED STATES PATENT OFFICE 2,075,038

METHOD AND APPARATUS FOR MANUFACTURING AERATING BLOCKS FOR SEWAGE DISPOSAL FILTER BEDS

John C. Hutchinson, Brazil, Ind.

Application February 18, 1935, Serial No. 7,044

16 Claims. (Cl. 25—105)

This invention relates to a method and apparatus for manufacturing an aerating block for sewage disposal filter beds.

Sewage disposal filter beds are commonly constructed with a bed of crushed stone or other filter material beneath which there are provided a plurality of ducts for carrying off the filtrate and for passage of air to and from the bottom of the bed. The air passes upwardly through the finely divided fluid in the bed during certain periods of operation of the filter and downwardly during other periods and performs an extremely important function in purifying the filtrate by oxidation as the filtrate trickles through the bed.

The principal object of the present invention is to provide a block, preferably made of salt glazed vitrified clay, for forming the ducts at the base of the filter bed. Another object of the invention is to provide a block so formed as to permit the greatest efficiency of aeration with a large volume of filtrate. To this end there is provided a block having longitudinal passages connecting with similar passages in adjacent blocks to form the ducts for air passage and filtrate run-off and having openings in the top of the block for passage of air to and from the filter bed and passage of the filtrate to the ducts, said openings being so shaped and arranged that the passage of filtrate is largely confined to a portion of the opening, thus leaving the remainder free for the passage of air. By this means the openings are not filled by filtrate to the exclusion of air even when there is a relatively large flow of the filtrate.

Another object of the invention is to form the openings in the top of the block so that they present the maximum cross sectional area for the passage of filtrate and air with the minimum reduction in the strength of the block. This is accomplished by forming the openings as elongated slots extending transversely to the direction of the interior ducts. The material remaining between the openings is thus left in the form of a complete arch extending across the interior duct and, therefore, gives maximum supporting strength for a given cross sectional area. The elongated form of the openings also provides that a finer, more efficient filter material can be used for a given area of opening without danger that the filter material will clog the opening.

The principal object of the method and apparatus of the invention is to provide means for manufacturing the block described with a minimum of expense for labor and power. The principal problem involved in the manufacture is the formation of the openings in the top of the block. In the method and apparatus herein described this is accomplished by cutting dies operating upon a preformed column of clay in which the longitudinal ducts have been already formed by means of the usual extrusion die attached to the common form of auger machine. Preferably the openings are cut as near the extrusion die as possible and before the clay column is cut into lengths to form the individual blocks.

In several prior patents, for example, Durant Patent No. 576,260, issued February 2, 1897, there are disclosed methods and apparatus for forming transverse openings in a clay column by means of cutters mounted on a rotating wheel and moving through a circular path intersecting the column. Such cutters have a bodily rotational movement about the axis of the wheel and, unless the wheel is extremely large, the axis of the cutter is moved through a considerable angle during the time the cutter is in the clay. Such angular movement of the cutter makes a clean and well formed cut impossible. If the wheel is made large enough to reduce the angular movement of the cutter to a practical point, then the portion of the circular path of the cutter intersecting the clay column is relatively flat and the cutter remains in the clay a relatively long time. When closely spaced openings are required this fact makes it necessary for two or more cutters to be in the clay at the same time, thus increasing the force required to operate the cutters. Since this force is generally supplied direct from the clay column itself, it is important that it be reduced to a minimum to prevent buckling of the column.

In the preferred embodiments of the present invention disclosed herein, the cutters have a substantially translatory movement throughout their entire path, as distinguished from a bodily rotation. For example, the axes of the cutters remain in a substantially upright position when operating upon the upper face of the column. There is a slight angular movement in some cases but the path of travel of the cutter is so short in each case that the change of angle is not large enough to have a bad effect on the cut. The path of travel of the cutter is in the nature of an ellipse, rather than a circle, the long axis of the ellipse being transverse to the direction of the clay column. This form of path reduces to a minimum the time which the cutter must spend in the clay column and makes it possible to cut closely spaced openings with a single cutter, and also reduces the angular movement of the cutter while in the clay to a practical point.

The ellipse-like path is preferably obtained by a combination of two motions, both in the nature of reciprocation. The amplitude of one of the motions is preferably made adjustable to vary the width of the ellipse-like path, thus making it possible to vary the velocity component of the cutter in the direction of movement of the column to make the cutter travel as nearly as possible at the same speed as the clay column. Since only a small part of the path of the cutter near the end of the ellipse is in the column, the reciprocation in the direction of the clay column may be in the nature of simple harmonic motion produced by a crank or eccentric and will still be sufficiently close to a constant velocity to cause the cutter to travel with the clay without distortion of the clay surrounding the cutter.

Other objects and features of the invention will be readily understood from the accompanying drawings and the following description and claims:

Fig. 1 is a perspective view of one form of the block. Fig. 2 is a sectional view of the cutter used for forming the top openings in the block shown in Fig. 1. Fig. 3 is a perspective view of a slightly different form of the block. Fig. 4 is an elevational view of the front of one form of apparatus used for forming the top openings. Fig. 5 is a side elevational view of the same with parts of the extrusion die cut away to show other parts in detail. Fig. 6 is a side elevational view of a second form of apparatus used for the same purpose. Fig. 7 is a plan view of the same. Fig. 8 is a fragmentary plan view on a larger scale of a portion of the apparatus shown in Fig. 6. Fig. 9 is a sectional view of the cutting apparatus used with the constructions of Figs. 6 and 7. Fig. 10 is a front elevational view of another form of the apparatus. Fig. 11 is a side elevational view of the same. Fig. 12 is a diagram showing the shape of the cutter path with the apparatus of Figs. 4 and 5. Fig. 13 is a similar diagram for the apparatus of Figs. 6 and 7. Fig. 14 is a sectional view of a filter bed showing the manner in which the blocks are assembled for use.

In Fig. 1 there is illustrated a block 20 having longitudinal passages 21 therethrough which are adapted to communicate with similar passages in adjacent blocks to form the ducts for passage of air to and from the filter bed and for removal of the filtrate therefrom. In the upper surface of the block there are formed a number of openings 22. The openings 22 are elongated in shape and extend transversely to the axes of the passages 21. Each of the openings 22 extends substantially across one of said passages. Because of the elongated forms of the openings and the fact that the openings in each longitudinal row are relatively close together, it will be apparent that the ends of the openings receive filtrate from a much larger area of the filter bed in proportion to their cross section than the central portions of the openings. The central portion of each opening receives filtrate only from the filter bed directly above said central portion and from a small area of filter bed between the central portions of adjacent openings, whereas the ends of the openings receive filtrate from a corresponding area and, in addition, receive filtrate from the filter bed area between the two rows of openings. By this arrangement, therefore, the end portions of the openings may receive filtrate in sufficient quantity to completely prevent the passage of air while at the same time, the central portions of the openings are receiving a proportionately less volume of filtrate and may be open for substantially free passage of air. The shape and arrangement of the openings, therefore, is such that a relatively large volume of filtrate may be handled without completely preventing the movement of air.

In order to insure still further the free movement of air through the central portion of each opening, the end portions thereof have their upper edges beveled or rounded as shown at 23, while the central portions are provided with substantially square corners 24. The square corner projecting beyond the beveled surface forms a shoulder or baffle which deflects filtrate coming into the end portions away from the central portion of the openings and thus increases the tendency of the central portion to remain free for air passage.

Another advantage arising from the transverse arrangement of openings 21 resides in the fact that the material 25 between adjacent openings forms a bridge across the passage 21. Because of the fact that the upper contour of the passage 21 is substantially semi-circular, this bridge has the form of a complete arch which gives a maximum supporting strength with a minimum of material. Thus, the percentage of area of the upper surface of the block occupied by the opening may be relatively large without seriously diminishing the strength of the block. The load-carrying ability of the block is extremely important since it must support the entire amount of filter material included in the bed above the block and since this material is relatively heavy and must be used in considerable depth.

In Fig. 14 a number of the blocks are shown assembled in a filter bed. The blocks 20 are laid in a grout 173 of sand and cement on the concrete floor 174 of the filter. The filter material, usually crushed stone 175, is piled on the blocks and is retained by the wall 176 of the filter.

A modified form of the block which may be advantageously used under less rigorous conditions than that in Fig. 1 is shown in Fig. 3. In this figure the block 120 is provided with longitudinal passages 121 which are octagonal rather than circular in cross section. The openings 122 in the upper surface of the block are formed as simple rectangles without the beveled or rounded edges shown in Fig. 1. Such openings possess all of the advantages of the beveled openings except the baffle effect since the arrangement is such that the material between the openings still forms a load-supporting bridge and since the relative area drained by the central portions of the openings is less than that drained by the end portions so that the central portions may be free for air passage while the end portions are receiving filtrate to their full capacity. The octagonal form of the longitudinal duct is optional and may be used where the strength of the full arch structure is not necessary. If desired the top or bottom sections of the duct or both may be made semi-circular.

Referring now to the apparatus shown in Figs. 4 and 5, there is illustrated an extrusion die 26 mounted on the front of a common form of auger machine, a fragment of which is shown at 27. The die is provided with a bridge 28 extending within the machine and upon which there are supported a pair of cores 29 for forming the longitudinal passages 21 and also a plurality of smaller cores 30 for forming smaller longitudinal openings 31 for reducing the weight of the block in places where the material can be omitted without substantially decreasing the strength of the block. The machine is provided with the usual auger 32 which is rotated in any desired manner to force the clay from the interior of the machine through the die. The clay is thus extruded from the die in the form of a continuous column having the longitudinal openings 21 and the smaller openings 31 formed therein. The moving column of clay 33 is received upon a conveyor belt 34 which is suitably supported on rollers 35 and which passes over a pulley 36 adjacent the die 26. The conveyor 34 is of the type known in ceramic arts as a "measuring belt" and is driven by the friction of the clay column upon its upper surface. The speed of movement of the clay column is thus measured by the speed of movement of the measuring belt, which in turn rotates the pulley 36 and the shaft 37 upon which the pulley is mounted at a speed directly proportional to the speed of the clay column.

Secured to the die 26 there is a horizontal frame member 38 which supports a pair of upright frame members 39 and a smaller pair of upright frame members 40. The frame members 39 carry adjacent their upper ends bearing blocks 41 supporting a horizontal shaft 42 and bearing blocks 43 support a crank shaft 44. The shaft 42 carries a sprocket 45 about which there is trained a sprocket chain 46 which also passes over a sprocket 47 carried by the shaft 37 of the measuring belt. The shafts 42 and 44 carry gears 48 and 49 respectively which mesh with each other. By means of these connections the crank shaft 44 is rotated at a speed directly proportional to the speed of movement of the clay column.

The crank shaft 44 is provided with a pair of oppositely positioned cranks 50, the position of which is best seen in Fig. 5. Each of the cranks is provided with a pair of crank straps 51 to each of which there is connected a downwardly extending rod 52. The lower end of the rod 52 carries a frame 53 to the under surface of which there is attached the cutter proper 54, a cross section of which is shown in Fig. 2.

The frame members 40 support bearings 55 in turn supporting a shaft 56. The shaft 56 is driven from the shaft 44 by means of a sprocket 57, chain 58 and a sprocket 59. Each end of the shaft 56 supports a crank plate 60 having a T-slot 61 extending across the face thereof. Crank pins 62 are adjustably mounted in the T-slots 61 and may be clamped in any desired position along said slot in a well known manner. Connecting rods 63 are pivotally connected to the crank pins 62 and each has its opposite end extending through a lug 64 formed on the corresponding rod 52. Each connecting rod 63 has a collar 65 secured thereto which engages one surface of the lug 64, while the opposite surface of said lug is engaged by a compression spring 66 which surrounds the connecting rod 63 and is held in place by a washer 67 and a lock nut 68.

The cutter proper 54 is preferably formed as shown in Fig. 2 and consists of a shell 69 preferably of sheet metal enclosing a central passage 69a. Within the lower edge of the shell there is placed a second thickness 70 of similar material extending around all or a part of the circumference of the shell which reduces the size of the central passage at its lower end. The cores 29 are provided with outwardly extending lips 71 beneath the cutter. As the cutters are forced downwardly into the clay column, the edges thereof cut a slug of clay from the column, the wall of the column being supported by the lip 71 of the core. Because of the increased thickness of the cutter at its lower end, the clay is compressed in passing upward through the cutter and immediately expands above the thickened portion 70. The expansion of the clay insures that the slug will be drawn from the openings as the cutter is again raised. It is obvious that this increased thickness may be secured by other means than the insertion of a second thickness of material. The cutter may be formed in one piece with a thicker wall at the desired point or the sides may be set at a slight angle, which will give the same expansive action to the clay. When the cutter is again pressed downward to cut another opening, the new slug of clay forces the preceding slug upwardly within the frame 53. The successive slugs are guided upwardly and outwardly by the guide plates 72 and 73 until they are thrown clear of the clay column.

During the cutting operation the sides of the clay column are guided and prevented from bulging outwardly by angle plates 75 secured to the nose of the die. When it is desired to form the openings 22 with the beveled or rounded corners 23, the cutter is supplied with fillets 78 which press back the clay at the corner.

It will be apparent that the path of movement of the cutters, by proper adjustment of the crank pins 62, may be in the form of an ellipse as illustrated by the line 74 in Fig. 12, the vertical dimension of the ellipse being determined by the movement of the cranks 50 relative to the frame of the machine and the horizontal dimension being determined by the movement of the cutter support consisting of the straps 51, rod 52 and frame 53 relative to the cranks 50 upon which they are mounted. Only a small portion of the elliptical path of the cutter is in the clay column. During this small portion of the movement the cranks 50 and crank pins 62 are near the lowermost parts of their travel and the horizontal components of their motion are, therefore, at a substantially uniform velocity. A nearly uniform horizontal velocity is therefore transmitted to the cutter and this velocity may be made nearly equal to that of the clay column by proper adjustment of the crank pins 62. The springs 66 provide a slight flexibility which compensates for small differences in the velocities. The movement of the cutter relative to the clay column is therefore substantially at a right angle to the axis of the column and the cutter remains in substantially the same angular position during the cut. A clean, well formed opening is therefore produced.

In the apparatus of Figs. 4 and 5, two of the cutters 54 are shown, each independently operated by a crank 50 and a connecting rod 63. The two cutters are offset as shown in Fig. 5 so that one cutter operates closer to the die 26 than the other. Thus the cutters may operate alternately and still place the openings 22 in one row in alignment with those of the other row as seen in Figs. 1 and 2. The measuring belt, therefore, supplies the force for only one cutter at any one time. To assist in starting the apparatus a hand crank 76 is attached to the shaft 42. The crank is balanced by a counterweight 77 which, together with the crank, gives a fly wheel effect, distributing the power requirement more uniformly over the cycle.

In Figs. 6, 7, 8 and 9 there is shown a modified form of apparatus for forming the openings 22.

In these figures like numbered parts have the same construction and function as in Figs. 4 and 5. The die 26 supports bearings 123, in turn supporting a shaft 124 which carries a sprocket 125 driven by a chain 126. The chain 126 is driven by a sprocket 127 mounted on a shaft 128. The shaft 128 is driven from the measuring belt shaft 37 by means of gears 129 and 130. By this arrangement the shaft 124 is rotated in timed relation with the movement of the measuring belt 34 and the clay column 33.

A pivot shaft 131 is mounted on bearing brackets 132 carried by the die 26. A movable frame member 133 is pivotally mounted on pivot shaft 131 and has rigidly secured thereto four rods 134 extending substantially horizontally. The rods 134 have slidably mounted thereon a corresponding number of tubular members 135 which are rigidly secured together by frame members 136 to form a unitary structure horizontally slidable upon the rods 134. A cutter supporting frame 137 is slidably mounted upon the tubular members 135 and is resiliently held in place thereon by means of springs 138. The frame 137 carries a pair of cutters 139 similar in structure to the cutters 54, previously described. Within the frame 137 there are provided guide plates 140 for guiding the slugs of clay and discharging the same free of the clay column.

The shaft 124 carries a pair of discs 141, each having three rollers 142 mounted thereon. The rollers 142 are equally spaced as best seen in Fig. 8 and are adapted to engage fittings 143 carried by the tubular members 135. The fittings 143 are each formed with lugs 144 adapted to engage the rollers and, when so engaged, to move the tubular members 135 to the right or left upon the rods 134. The said tubular members are so spaced that during a part of the rotation of the shaft 124 one of the rollers acts upon the upper fitting 143 to raise the rods and the cutter to clear the clay column while during a different part of the revolution another roller engages the lower fitting 143 and presses the cutter into the clay. In Fig. 8 the position of the rollers is shown at substantially the half way point on the upward travel of the cutter. At this point the lowermost roller 142 has completed the movement of the cutter to the left and is just about to pass beyond its corresponding fitting 143. The uppermost roller has started the upward movement of the cutter and has just engaged the lug 144 to commence the movement of the cutter to the right. The movement to the right continues under the influence of the uppermost roller until the cutter has reached its greatest height and is started on its downward movement by the weight of the cutter resting on the uppermost roller. When the right hand movement is complete the roller at the right of Fig. 8 has descended sufficiently to engage the lowermost lug 144 and commences the left hand movement of the cutter. Soon thereafter the cutter engages the clay and is pressed into the same by the downward movement of the last-mentioned roller.

Since the right and left hand movements of the cutter are accomplished during only approximately sixty degrees of the rotation of the rollers 142, the path of movement of the cutter will not be a true ellipse but will be along the arcs of two intersecting ellipses, as shown in Fig. 13 by the broken line 145. This path, while not a true ellipse, is ellipse-like in form. Because of the fact that the right and left hand movements of the cutter take place only while the rollers are near the top and bottom of their rotation, the velocity of these movements in the horizontal direction is practically uniform. Slight variations from uniformity are taken care of by the springs 138. In this apparatus the vertical movement of the cutter is accomplished by the movement of the frame member 133 upon its pivotal mounting 131 on the frame of the machine, while the horizontal movement of the cutter is accomplished by the movement of the cutter support relative to the movable frame 133.

A third alternative form of the cutting apparatus is illustrated in Figs. 10 and 11 wherein like numbered parts have the same construction and functions as in Figs. 4 and 5. In this construction a horizontal frame member 220 is supported upon the die 26 and carries vertical frame members 221 and 222 which are secured together adjacent their upper ends by horizontal frame members 223. The frame members 221 carry bearings 224 supporting a shaft 225 which is rotated in timed relation to the movement of the clay column by means of a sprocket 226 on the shaft 37, a chain 227 and a sprocket 228 on the shaft 225. A crank shaft 229 is supported by a bearing 230 on one of the upright frame members 221 and by a bearing 231 formed on a cross head guide plate 232, said guide plate being mounted upon the horizontal frame members 223. The said crank shaft is driven from the shaft 225 by gears 233 and carries a crank disc 234 having a crank pin 235 engaging a slotted opening 236 in a cross head 237 slidably mounted in the cross head guide 232. A downwardly extending rod 238 is supported upon the cross head 237 by means of a clevis 239 and pin 240. The rod 238 carries at its lower end a frame 241 carrying a pair of cutters 242 similar in construction to those already described. The frame 241 is provided with side plates 243 and guide plates 244 for guiding the slugs of clay free of the clay column.

The vertical frame members 222 carry bearings 244 supporting a cam shaft 246, said cam shaft being driven from the crank shaft 229 by a chain 247 and suitable sprockets. The cam shaft 246 carries a heart cam 248 which is engaged by followers 249 carried upon the upper end of a yoke lever 250. The lower end of the lever 250 is pivotally connected to and supported by a cross head 251 slidable in cross head guides 252 secured to one of the frame members 222. The lever is provided with a slotted opening 253 which is engaged by a pivot pin 254 carried by a bracket 255 adjustably mounted upon a base 256 secured to one of the vertical frame members 222. A connecting rod 257 is pivotally connected to the cross head 251 and passes through a suitable opening in the rod 238. A shoulder 258 on the connecting rod abuts against one side of the rod 238 while a compression spring 259 surrounding the rod 257 abuts against the opposite side of the rod 238. The spring 259 is retained in place by a washer 260 and lock nut 261.

The cam 248 is of the familiar type adapted to impart to the followers a substantially uniform horizontal motion, first to the right and then to the left. This motion is imparted to the lower end of the lever 250 and the connecting rod 257 by the movement of said lever about the fulcrum pin 254. The horizontal movement of the cutter 242 is, therefore, at a substantially uniform velocity during the time that the cutter is in the clay column. The vertical movement of the cutter is accomplished simultaneously by the vertical movement of the cross head 237 under the influence of the crank pin 235.

The path of movement of the cutter with this form of apparatus will not be a true ellipse but will be ellipse-like in form, the amplitude of the vertical reciprocation being determined by the throw of the crank pin 235 and the amplitude of the horizontal movement being determined by the movement of the connecting rod 257. It is apparent that the horizontal amplitude may be varied by vertical adjustment of the fulcrum bracket 255 without destroying the uniformity of velocity imparted by the heart cam 248. Here, again, the vertical movement of the cutter is obtained by movement of a movable member (cross head 237) upon the stationary frame of the machine while the horizontal movement of the cutter is obtained by movement of the cutter carrier relative to the said movable member. In forming closely spaced openings in the top of the clay column the amplitude of the horizontal movement is very small. The cutter, therefore, has an extremely small angular movement about the pivot pin 240. The movement of the cutter, therefore, may be considered as substantially translatory and a clean, well-formed opening is, therefore, formed by the cutter.

While the foregoing specification describes several preferred forms of the invention, the details thereof may be varied through wide limits without departing from the scope of the invention as defined by the following claims.

The invention claimed is:

1. A method of forming a ceramic block having a longitudinal passage and transverse openings in the wall thereof consisting in extruding a column of plastic material through a die adapted to form the longitudinal passage, removing slugs of clay from a wall thereof to form said openings, and discharging said slugs free of the clay column.

2. Apparatus for forming a ceramic block having a longitudinal passage and transverse openings in the wall thereof, including a die having a core adapted to form said longitudinal passage, means for extruding a column of plastic material through said die, a cutter shaped to cut said openings, and means for reciprocating said cutter in two directions one of which is substantially in the direction of movement of the column and the other substantially at a right angle thereto.

3. Apparatus for forming a ceramic block having a longitudinal passage and transverse openings in the wall thereof, including a die having a core adapted to form said longitudinal passage, means for extruding a column of plastic material through said die, a cutter shaped to cut said openings, and means for imparting to said cutter a substantially translatory movement having a component toward and away from said column and a second component in the direction of movement of said column, said cutter entering and leaving said column during said movement to cut said openings therein.

4. Apparatus for forming a ceramic block having a longitudinal passage and transverse openings in the wall thereof, including a die having a core adapted to form said longitudinal passage, means for extruding a column of plastic material through said die, a cutter shaped to cut said openings, and means for imparting to said cutter a substantially translatory movement in a curved path entering and leaving said column to cut said openings therein, said movement having its velocity component in the direction of movement of the column substantially equal to the velocity of said column movement.

5. In a device for forming openings in the wall of a clay column extruded from an auger machine, the combination of a cutter having a central passage for receiving slugs of clay cut from said column and having a cutting edge adjacent the receiving end of said passage for forming said slugs, and guide members associated with the opposite end of said passage and arranged to receive slugs forced from said passage by succeeding slugs and to guide the same to a discharge point free of said clay column.

6. In a device for forming openings in the wall of a clay column extruded from an auger machine, the combination of a cutter, crank means for moving said cutter into and out of the clay column to form said openings, and other means for imparting to said cutter a movement in the direction of the clay column substantially equal in velocity to that of the clay column.

7. In a device for forming openings in the wall of a clay column extruded from an auger machine, the combination of a movable member, a cutter support pivotally mounted on said movable member, a cutter carried by said cutter support, means for moving said movable member in timed relation with the movement of the column to move said cutter and support to bring the cutter into and out of said clay column for forming said openings, and means for moving said support about its pivotal mounting to cause said cutter to move with the clay column during the cutting operation.

8. In a device for forming openings in the wall of a clay column extruded from an auger machine, the combination of a movable member, a cutter support pivotally mounted on said movable member, a cutter carried by said cutter support, means for moving said movable member in timed relation with the movement of the column to move said cutter and support to bring the cutter into and out of said clay column for forming said openings, a crank rotated in timed relation with the movement of the clay column, and a connecting rod connecting said crank and said cutter support and moving the latter about its pivotal mounting to cause the cutter to move with the clay column during the cutting operation.

9. In a device for forming openings in the wall of a clay column extruded from an auger machine, the combination of a movable member, a cutter support pivotally mounted on said movable member, a cutter carried by said cutter support, means for moving said movable member in timed relation with the movement of the column to move said cutter and support to bring the cutter into and out of said clay column for forming said openings, an adjustable throw crank rotated in timed relation with the movement of the clay column, and a connecting rod connecting said crank and said cutter support and moving the latter about its pivotal mounting to cause the cutter to move with the clay column during the cutting operation.

10. In a device for forming openings in the wall of a clay column extruded from an auger machine, the combination of a movable member, a cutter support pivotally mounted on said movable member, a cutter carried by said cutter support, means for moving said movable member in timed relation with the movement of the column to move said cutter and support to bring the cutter into and out of said clay column for forming said openings, a uniform motion cam rotated in timed relation with the movement of the clay column, and connections between said cam and said cutter support by means of which the latter is moved about its pivotal mounting to cause the cutter to move with the clay column during the cutting operation.

11. In a device for forming openings in the wall of a clay column extruded from an auger machine, the combination of a movable member, a cutter support pivotally mounted on said movable member, a cutter carried by said cutter support, means for moving said movable member in timed relation with the movement of the column to move said cutter and support to bring the cutter into and out of said clay column for forming said openings, a uniform motion cam rotated in timed relation with the movement of the clay column, a lever having a follower riding upon said cam, an adjustable fulcrum for said lever, a connecting rod connected to said lever and to said cutter support and imparting to the latter a substantially uniform motion about its pivotal mounting to cause said cutter to move with the clay column during the cutting operation.

12. A method of forming a ceramic block having a longitudinal passage and transverse openings in the wall thereof consisting in extruding a column of plastic material through a die adapted to form the longitudinal passage, and repeatedly forcing a cutter through a wall of said column to form said openings, the movement of said cutter being in an ellipse-like path having its major axis transverse to the length of the column.

13. A method of forming a ceramic block having a longitudinal passage and transverse openings in the wall thereof consisting in extruding a column of plastic material through a die adapted to form the longitudinal passage, and repeatedly forcing a cutter through a wall of said column to form said openings, the movement of said cutter being substantially translatory and in an ellipse-like path having its major axis transverse to the length of the column.

14. In a device for forming openings in the wall of a clay column extruded from an auger machine, the combination of a frame, a movable member mounted on said frame, a cutter support movably mounted on said member, a cutter carried by said support and adapted to form said openings, means for moving said movable member relative to said frame to reciprocate said cutter in one direction, and means for moving said cutter support relative to said movable member to reciprocate said cutter in a direction transverse to the first mentioned direction, one of said directions being parallel to the movement of the clay column and the other being substantially at a right angle thereto.

15. In a device for forming openings in the wall of a clay column extruded from an auger machine, the combination of a frame, a movable member mounted on said frame, a cutter support movably mounted on said member, a cutter carried by said support and adapted to form said openings, and means for moving said movable member relative to said frame and for moving said cutter support relative to said movable member to impart to said cutter a movement in an ellipse-like path entering and leaving said column to form said openings.

16. In a device for forming openings in the wall of a clay column extruded from an auger machine, the combination of a frame, a movable member mounted on said frame, a cutter support movably mounted on said member, a cutter carried by said support and adapted to form said openings, and means for moving said movable member relative to said frame and for moving said cutter support relative to said movable member to impart to said cutter a substantially translatory movement entering and leaving said column to form said openings.

JOHN C. HUTCHINSON.